United States Patent
Nadejde et al.

(10) Patent No.: US 12,499,330 B1
(45) Date of Patent: Dec. 16, 2025

(54) CUSTOMIZED MACHINE TRANSLATION USING CLIENT-SPECIFIED ATTRIBUTES

(71) Applicant: Amazon Technologies, Inc., Seattle, WA (US)

(72) Inventors: Maria Nadejde, Brooklyn, NY (US); Anna Currey, New York City, NY (US); Georgiana Dinu, New York, NY (US); William Jew Wong, Huntington Beach, CA (US); Margo Helena Lynch, Pittsburgh, PA (US); Tatyana Badeka, Fremont, CA (US); Jenyuan Wang, San Jose, CA (US); Shuoren Fu, Seattle, WA (US); Aakash Upadhyay, Seattle, WA (US); Eric J. Nowell, Kirkland, WA (US); Prajwal Gadad, Sunnyvale, CA (US); Advait Bhatwadekar, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 1005 days.

(21) Appl. No.: 17/491,109

(22) Filed: Sep. 30, 2021

(51) Int. Cl.
  *G06F 40/58* (2020.01)
(52) U.S. Cl.
  CPC .................... *G06F 40/58* (2020.01)
(58) Field of Classification Search
  CPC .......... G06F 40/58; G06F 40/55; G06F 40/47; G06F 40/44; G06F 40/40; G06F 40/247; G06F 40/211; G06F 40/242; G06F 16/3337; G06F 16/243; G06N 20/00
  See application file for complete search history.

(56) References Cited

U.S. PATENT DOCUMENTS

| 10,997,610 B2* | 5/2021 | Sakashita | G06Q 30/0201 |
| 2021/0209313 A1* | 7/2021 | Li | G06F 17/00 |

OTHER PUBLICATIONS

Ronan Collobert, et al. "A Unified Architecture for Natural Language Processing: Deep Neural Networks with Multitask Learning," In Proceedings of the 25th International Conference on Machine Learning, Helsinki, Finland, 2008, pp. 1-8.
Sebastian Ruder, et al., "An Overview of Multi-Task Learning in Deep Neural Networks," Appeared as a blog post at http://sebastianrude.com/multi-task/index.html on May 29, 2017, arXiv preprints arXiv:1706.05098v1, pp. 1-14.
Farhad Nooralahzadeh, et al., "Zero-Shot Cross-Lingual Transfer with Meta Learning," Proceedings of the 2020 Conference on Empirical Methods in Natural Language Processing, pp. 4547-4562, Nov. 16-20, 2020. c 2020 Association for Computational LinguisticsarXiv preprint arXiv:2003.02739v4 (Oct. 5, 2020).

(Continued)

*Primary Examiner* — Angela A Armstrong
(74) *Attorney, Agent, or Firm* — Robert C. Kowert; Kowert, Hood, Munyon, Rankin & Goetzel, P.C.

(57) ABSTRACT

A respective label set is obtained for a number of translation unit pairs, with each pair comprising a set of language elements in a first language and the translation of the set of language elements to a second language. The label set includes values of one or more translation customization attributes. A value of such an attribute associated with a translation request is identified. A translated version of an input set of language elements indicated in the translation request is generated in accordance with the value of the attribute, using a machine learning model trained with the help of the label sets.

20 Claims, 10 Drawing Sheets

(56) References Cited

OTHER PUBLICATIONS

Hongchao Fang, et al., "CERT: Contrastive Self-supervised Learning for Language Understanding," arXiv preprint arXiv:2005.12766v2 [cs.CL] Jun. 18, 2020, pp. 1-16.

Yue Yu, et al., "Fine-Tuning Pre-trained Language Model withWeak Supervision: A Contrastive-Regularized Self-Training Approach," arXiv preprint: arXiv:2010.07835v3 [cs.CL] Mar. 31, 2021, pp. 1-15.

Tianyu Gao, et al., "SimCSE: Simple Contrastive Learning of Sentence Embeddings," arXiv preprint: arXiv:2104.08821v3 [cs.CL] Sep. 9, 2021, pp. 1-17.

Xiao Pan, et al., "Contrastive Learning for Many-to-many Multilingual Neural Machine Translation," arXiv preprint: improvarXiv:2105.09501v3 [cs.CL] Jul. 22, 2021, pp. 1-15.

Surafel M. Lakew, et al., "Neural Machine Translation into Language Varieties," Proceedings of the Third Conference on Machine Translation (WMT), vol. 1: Research Papers, pp. 156-164, Brussels, Belgium, Oct. 31-Nov. 1, 2018. copyright 2018 Association for Computational Linguistics, https://doi.org/10.18653/v1/W18-6316.

Alexis Conneau, et al., "Unsupervised Cross-lingual Representation Learning at Scale," arXiv preprint: arXiv:1911.02116v2 [cs.CL] Apr. 8, 2020, pp. 1-12.

Shijie Wu, et al., "Beto, Bentz, Becas: The Surprising Cross-Lingual Effectiveness of BERT," arXiv preprint: arXiv:1904.09077v2 [cs.CL] Oct. 3, 2019, pp. 1-12.

\* cited by examiner

Grammatical gender 310

Formality level 320

Locally-prevalent measurement unit system 330 (e.g., for distances, weights, currencies, time...)

Presentation style guidelines 340 (e.g., for product documentation, customer support artifacts, educational materials...)

Cultural constraints 350 (e.g., involving avoidance of terms with negative connotations in a given culture, use of acronyms, target age-group specific terminology, etc....)

Quantity 360 (e.g., whether the term "you" is to refer to one entity or multiple entities...)

Constraints on output length 370

Blocked/allowed words 380

Transcreation-related attributes 390

Refine/modify pre-trained multi-lingual language model 630 using multi-task learning (MTL) and an additional training data set with target language examples with TCA labels Refine/modify pre-trained MTM 640 using MTL and an additional training data set with target language examples with TCA labels; a version of this model may be used to perform TCA-based translations Utilize model which can perform zero-shot cross-lingual transfer 650 with no labeled examples in target language required

Hospitality 801 (e.g., at hotel front desk, cruise ship, etc.)

Education 804

Customer support 807 (e.g., via live chats or bots)

Technical documentation 810

Real-time meetings/conversations 812

Social media application posts 814

CUSTOMIZED MACHINE TRANSLATION USING CLIENT-SPECIFIED ATTRIBUTES

BACKGROUND

To facilitate communication across language boundaries, machine translation algorithms and models are often used, especially in circumstances in which manual translation is impracticable. Depending on the pair of languages involved, in some cases a given set of words in one language can be translated by a machine translation model into another language in more than one way, with several technically correct translations possible. However, if the intent of the words is taken into consideration, some of the translations may not be as appropriate as others.

BRIEF DESCRIPTION OF DRAWINGS

FIG. 3 illustrates examples of attributes which may be taken into account at a machine translation service for customized translations, according to at least some embodiments.

FIG. 6 illustrates example techniques for generating translation customization attributes as labels for translation unit pairs, according to at least some embodiments.

FIG. 8 illustrates example problem domains in which customized machine translation techniques may be beneficial, according to at least some embodiments.

Figure 1:
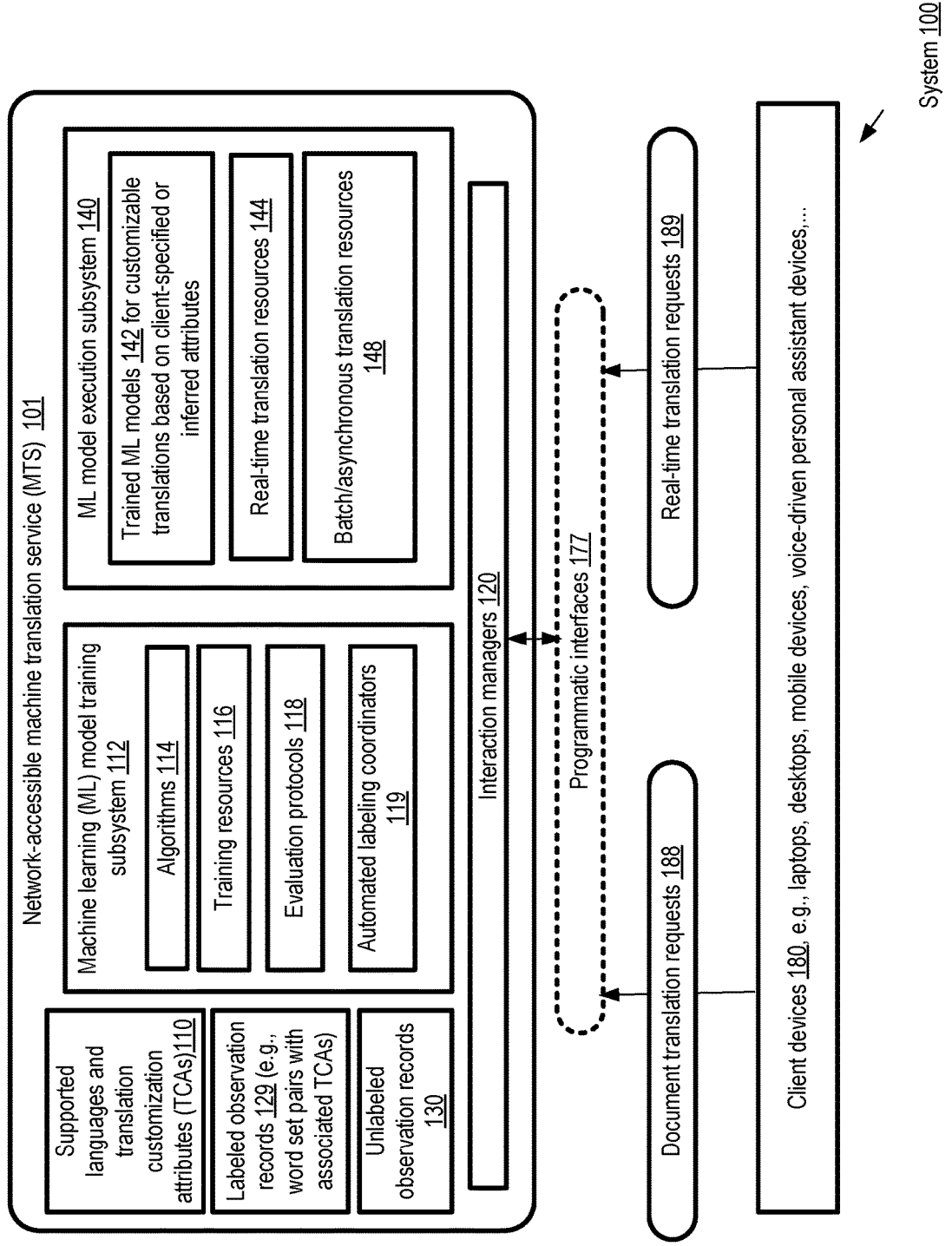
FIG. 1 illustrates an example system environment in which customized translations may be provided by a network-accessible machine translation service based on combinations of attributes which can be specified by translation requesters, according to according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for customizable machine translations using machine learning models that have been trained to take translation-impacting attributes such as grammatical gender, formality level and the like into account when values for such attributes are specified or can be inferred, while still providing high quality default translations in scenarios in which values of such attributes cannot be ascertained. Such customizable translations can be provided, for example, to clients of a network-accessible machine translation service (MTS) of a cloud provider network in response to translation requests, and/or to clients of translation tools or applications run on mobile devices or other computing resources that are not part of a cloud computing environment. As an example scenario in which customization attributes such as gender and formality level may be of importance, consider translations into Spanish, a language in which gender and formality level often determine word endings or spellings, from a language such as English, in which gender and formality level often do not determine word endings or spelling. For a given word set (such as a sentence or phrase) in English, it may therefore be possible to generate several different grammatically correct translations in Spanish, each corresponding to a given combination of the attributes. However, depending on the expectations or intentions of the users on whose behalf the translations are being generated, some of the translations may be inappropriate and may even lead to misinterpretations of the intended message. Some traditional machine translation systems, which do not support customization based on attributes such as gender or formality, can in effect end up choosing one translation at random (or based on assumptions that are not necessarily applicable to the translation request being considered) from among various grammatically correct translations, which is not desirable from the perspective of the end users of the systems. Such problematic situations can be resolved with the help of the techniques described herein, using machine translation models (MTMs) that can choose the most appropriate translation given a set of values of translation-impacting attributes provided by a client or inferred on behalf of the client.

The MTMs employed at an MTS can include fairly large neural networks, such as deep neural networks implementing encoder-decoder pairs. Training of such MTMs for customized translations often requires a substantial number of labeled translation unit pairs (e.g., pairs of word sets, with the second word set comprising a translation of the first sentence from a first language into a second language), with the labels representing the attributes in accordance with which the units of the pair are translated. Such labels, if they are to be generated manually, require annotators fluent in the languages involved. This means that generating enough labels for training the models manually may be difficult, especially when translations between numerous pairs of languages are to be performed at an MTS. For at least some language pairs, for which a sufficiently large labeled corpus of translation unit pairs may not be easily available, label sets (each potentially including values of multiple translation customization attributes) can be automatically generated for unlabeled translation unit pairs with the help of additional machine learning models at the MTS, e.g., using techniques such as multi-task learning or zero-shot cross-lingual transfer. After the MTMs used for attribute-dependent customized translations are trained, e.g., using the automatically generated label sets, they may be deployed in production environments to provide customized translations for numerous applications, such as document translation, educational material preparation, real-time conversation or chat translations, and so on. Note that conventional machine translation systems are often trained on translation unit pairs which do not include attribute value information.

As one skilled in the art will appreciate in light of this disclosure, certain embodiments may be capable of achieving various advantages, including some or all of the following: (a) improving the quality and context-specific accuracy of machine translations provided for multiple language pairs, thereby reducing the likelihood of culturally inappropriate or unexpected translations, (b) reducing the time it takes to train MTMs to provide customized translations for additional pairs of languages by quickly generating labels for large numbers of unlabeled translation unit pairs and/or (c) reducing the computational, storage, time and other resources which might otherwise be required to deal with misunderstood translations, e.g., at dialog-driven applications, customer support applications and the like.

According to some embodiments, a system may comprise one or more computing devices. The computing devices may include instructions that upon execution on or across the computing devices cause the computing devices to obtain, from a first collection of one or more machine learning models at a translation service of a provider network, a respective label set for individual ones of a plurality of unlabeled translation unit pairs (TUPs). A given TUP may comprise a first set of words in a first language and a corresponding translated second set of words in a second language. The sets of words may, for example, each comprise one or more sentences, phrases and the like; a given word set in a given language need not necessarily be grammatically correct as long as it is part of common usage and its meaning is clear to users of that language. A label set for a particular TUP may indicate, for at least one set of words of the translation unit pair, respective values of a plurality of translation customization attributes (TCAs) from a collection of TCAs which includes (a) grammatical gender and (b) formality level. The second set of words of the TUP may represent a translation of the first set from the first language to the second language in accordance with the TCAs of the label set in various embodiments. That is, the ML models may be able to infer, given a pair of translated word sets, the values of the attributes which, if taken into account, would have led to that particular translation. After the label sets are obtained, the labeled TUPs may be used to train MTMs of the translation service (e.g., as part of a larger training set which also includes unlabeled TUPs), and the trained MTMs may be deployed to provide TCA-dependent or TCA-driven translations in at least some embodiments.

An attribute value tuple associated with a first request to translate a first input set of words in the first language into the second language may be determined at the translation service in various embodiments. The attribute value tuple may comprise respective values of a group of one or more TCAs of the collection of TCAs from which label sets were generated earlier. In some embodiments, at least one TCA of the attribute value tuple may be indicated by a submitter of the first request, e.g., as a parameter of the request. In response to the first request, a first translated version of the first input set of words may be produced at the translation service. The first translated version may comprise a translation of the first input set of words into the second language in accordance with the attribute value tuple, and may be generated using one of the MTMs trained at least in part using respective label sets obtained/generated earlier for the plurality of unlabeled translation unit pairs.

A second request to translate the same input set of words into the second language may be received at the service in various embodiments. A submitter of the second request may not have indicated any translation customization attributes for the second request. In response to the second request, a second translated version of the first input set of words may be generated, e.g., using the same MTM as the one used for the first request. The second translated version may also comprise a translation of the first input set of words into the second language, which differs from the first translated version generated earlier. For additional requests to translate the same input, for which attributes can also not be determined, the MTM may in some cases produce additional different translations, or the same translation that was provided in response to the first or second request. For additional requests for which one or more TCAs can be inferred or are supplied by the requester, the MTM may provide the appropriate translation generated based on the TCAs. In some cases, one or more TCA values may be indicated by a submitter of a translation request, while other TCA values may be inferred. In one implementation, an inferred value of a TCA for a translation request may be overridden if a submitter of the request provides a different value for the same TCA.

A number of different approaches may be used to produce the label sets for unlabeled word set pairs in different embodiments. In one embodiment, for example, a trained MTM (which can already produce translations for unlabeled word sets between at least one pair of languages) may be fine-tuned or modified, using a multi-task learning methodology, to also generate label sets for the unlabeled word sets. In multi-task learning, a given machine learning model can be trained to generate several different outputs for a given input, with each output representing a different objective or task (with the different tasks typically being logically related to one another). To fine tune a pre-trained deep neural network using multi-task learning methodology, in some embodiments one or more layers may be added to the neural network, and/or parameters of existing layers may be modified, and a very small labeled training set may be employed to train the model further. In another embodiment, a trained multi-lingual language model (e.g., a model similar to multi-lingual Bidirectional Encoder Representations from Transformers (BERT) or cross-lingual language model-Roberta (XLM-R)), which has been trained to perform tasks that do not include machine translation per se, may be enhanced using multi-task learning, to generate the label sets. According to other embodiments, a zero-shot cross-lingual transfer (ZCT) model may be used to generate at least some label sets. Such a model may provide, as output, an inferred value of a TCA for at least one word set in a particular language, without having been trained using labeled word sets in that language. A ZCT model may be a language model that generates respective internal vector representations (e.g., indicative of interpretations or meanings), within the same vector space, of input word sets in several languages including, such as two languages L1 and L2. If a representation R1 of an input word set in language L1 happens to lie within a relatively small distance d1 (as computed for example using a Euclidean distance metric) of a representation R2 of an input word set in language L2, this would suggest that the meanings of the two word sets are more similar to one another than the meanings of word sets whose vector representations are separated by a larger distance d2. The ZCT model may be trained using TCA-labeled word sets in language L1 to infer TCAs for unlabeled input word sets in language L1, but its training data set may not contain any TCA-labeled word sets in language L2. Nevertheless, because of its ability to generate represent/ interpret input in L2 as well as L1, the ZCT model may be able to also infer TCAs for unlabeled input word sets in L2. The term "zero-shot" indicates that the ZCT model can provide such inferences for L2 TCAs despite have zero labeled L2 TCA examples in its training data. Other approaches towards generating labels for unlabeled TUPs may be utilized in some embodiments.

In some embodiments, customized translations of the kind introduced above may be used in verbal or text message conversations, with the input which is to be translated being captured using microphones or text input interfaces. For example, a phone-based front-end app or a mobile device-based application (client-side components of the MTS or other services) may capture conversation input from one end user in language L1 and communicate with back-end cloud provider network data center-based components of the MTS to obtain custom translations of the input into language L2 in real time based on one or more TCAs. The translations may then be passed on to another end user with whom the conversation is being conducted. TCAs may be indicated, for example, by one or both of the conversing parties in different embodiments, and used for translations in one or both directions between languages L1 and L2. In some embodiments, such customized translations may be provided via applications running on any of a variety of client-side devices, including but not limited to phones, mobile devices, laptops, desktops, voice-driven assistant devices, game players, or virtual reality or augmented reality devices. TCAs may be specified at such devices, for example, as part of application settings which apply to multiple conversations, on a per-conversation granularity and/or on a per-message or per-utterance granularity. Customized TCA-based translations may also be utilized for documents, articles and the like in various embodiments.

In addition to or instead of gender and/or formality levels, a variety of other TCAs may be used in some embodiments. For example, TCA values may indicate geographical region-based locally prevalent measurement unit systems, presentation style guidelines for certain types of documents, and/or other cultural constraints in some embodiments. Such cultural constraints may involve avoiding terms with negative connotations within a given culture, using (or avoiding) acronyms or age-group specific slang terms, and so on. In the case of translating between unit systems, as part of a customized translation between languages L1 and L2, measurement values expressed in one system (e.g., distances in feet or miles) used in one geographical region in L1 is the primary language may be automatically transformed/converted and expressed as corresponding measurement values in another system (e.g., distances in meters or kilometers) used in a different geographical region in which a second language L2 is the primary language.

In various embodiments, as indicated above, the MTMs that are deployed for production use at an MTS may have to be proficient not just at producing TCA-dependent translations but also at producing translations in scenarios when TCA values are unknown. In order to help achieve such generality, in various embodiments a phased training approach may be used for such an MTM. In at least one phase of multiple training phases, the MTM may be trained to produce TCA-agnostic translations or TCA-unaware translations using a training data set that does not include any label sets (comprising one or more TCA values) for TUPs in some embodiments. This may make the MTM proficient for translating in response to requests for which no TCAs are available. In at least one other phase in such embodiments, the MTM may be trained using a training data set that includes at least some label sets with TCA values for TUPs. This other phase may enable the MTM to learn to produce high quality translations when TCAs are provided by the requester or can be inferred from the context in which the to-be-translated words are used.

The TCA values to be used to determine the appropriate translation for an input set of words indicated in a translation request may in some cases be explicitly provided as a parameter of the translation request, e.g., by the submitter of the translation request. In some embodiments, the MTS may be able to infer at least some TCA values based on the context in which the translation is being performed. For example, if in an earlier portion of a conversation one of the participants explicitly indicates their gender or the formality level expected from the other participant(s), such information may be detected at the MTS and used to populate TCA values for a subsequent portion of the conversation. Other context information usable for inferring TCAS may, for example, include information about the setting (such as a hotel lobby or a customer support interaction) in which the translation is to be utilized.

In at least some embodiments, as indicated above, an MTS may be implemented as part of a cloud provider network. A cloud provider network (sometimes referred to simply as a "cloud" or as a "provider network") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or services, which may include a virtualized compute service (VCS), data processing service(s) (e.g., map reduce, data flow, and/or other large scale data processing techniques), data storage services (e.g., object storage services, block-based storage services, or data warehouse storage services), packet processing services, machine translation services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments, including an MTS of the kind introduced above. Network-accessible computing services can include an elastic compute cloud service (referred to in various implementations as an elastic compute service, a virtual machines service, a computing cloud service, a compute engine, or a cloud compute service). This service may offer compute instances of the kind discussed above (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments. In some embodiments, an MTS may utilize compute instances and/or software containers for performing some of its computations.

The traffic and operations of the cloud provider network may broadly be subdivided into two categories in various embodiments: control plane operations carried over a logical control plane, and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which customized translations may be provided by a network-accessible machine translation service based on combinations of attributes which can be specified by translation requesters, according to according to at least some embodiments. As shown, system 100 includes resources and artifacts of network-accessible machine translation service (MTS) 101, including machine learning (ML) model training subsystem 112, ML model execution subsystem 140, interaction managers 120, metadata indicating supported languages and translation customization attributes (TCAs) 110, as well as labeled and unlabeled observation records in the depicted embodiment. For each language for which TCAs can influence translations, a respective collection of applicable TCAs may be maintained as part of the metadata in various embodiments; the collection of TCAs applicable to one language may in some cases differ from the TCAs applicable to another language.

The MTS 101 may implement a set of programmatic interfaces 177, such as web-based consoles, command-line tools, application programming interfaces (APIs) and/or graphical user interfaces, which can be used by clients to submit translation-related requests and receive corresponding responses. At least two types of requests may be transmitted using the programmatic interfaces 177 in some embodiments from a variety of client devices 180, such as laptops, desktops, mobile computing devices (such as phones or tablets), voice-driven personal assistant devices and the like. The two types of requests include document translation requests 188, for which the requested translations may not be required immediately, as well as real-time translation requests 189 (e.g., requests to translate portions of a live two-way or multi-way audio or text message conversation). For at least some of the translation requests of either category, in addition to an indication of target language to which the input is to be translated, values of a set of attributes that can be used to select the most appropriate translation from among several possible grammatically correct translations may be determined at the MTS, e.g., from parameters or settings associated with the translation requests, and/or from the context in which the translated input is going to be used. Such parameters may be referred to as translation customization attributes (TCAs), translation-affecting attributes, or translation-impacting attributes. In some embodiments, translation requests 188 or 189 may optionally specify the source language in addition to the target language; in other embodiments, the MTS may detect the source language automatically.

The translation requests may be initially parsed and/or processed at interaction managers 120 of the MTS in various embodiments. The interaction managers 120 may pass on internal versions of the requests to other MTS components such as real-time translation resources 144 and/or batch/asynchronous translation resources 148 of the ML model execution subsystem 140 in the depicted embodiment. Trained ML models 142 for customizable translations based on client-specified or context-inferred TCAs may be utilized to obtain translations for the clients' translation requests, and the translations may be sent back to the clients via the programmatic interfaces 177 in at least some embodiments. The ML models 142 may be referred to as machine translation models (MTMs).

The MTMs used to respond to translation requests from clients may be trained using a variety of algorithms 114 (e.g., neural network-based algorithms including encoder-decoder based algorithms, transformer-based algorithms and the like) and training resources 116 of the ML model training subsystem 112 in the embodiment shown in FIG. 1. The quality of the translations generated by the MTMs may be determined after various iterations of the training, using a set of evaluation protocols 118, and the training may be terminated after the MTM satisfies target quality criteria defined at the MTS. The MTMs of the MTS 101 may be trained to provide translations between numerous pairs of supported languages in at least some embodiments. For at least some of the supported language pairs, TCAs may be applicable; for others, TCAs may not necessarily apply.

In various embodiments, the MTMs may comprise sophisticated deep neural network models which typically require large amounts of labeled observation records for training. A given unlabeled observation record 130 for an MTM may comprise a translation unit pair (TUP), consisting of a first word set (e.g., a sentence or phrase) in a source language and a translation of that word set into a second word set in a target language. A given word set in a source language such as English may potentially be translated into several different grammatically correct word sets in a target language such as Spanish in which TCAs such as gender and formality labels matter, so there may be multiple legitimate unlabeled TUPs with the same input word sets and differing translated word sets. Note that in some embodiments, instead of or in addition to word sets, groups of language elements other than words, such as lemmas or morphemes in the source and/or target language, may be used as the translation units which are paired to form TUPs.

For a variety of reasons including the long history of machine translation research, large quantities of unlabeled observation records 130 may be available for at least some language pairs of interest at the MTS. In order to obtain a sufficient quantity of labeled TUPs for training the models 142, label sets comprising the applicable TCA values which correspond to individual TUPs may be generated at the ML model training subsystem 112 in the depicted embodiment. The process of generating the label sets may be orchestrated by automated labeling coordinators 119 in the depicted embodiment. In at least some embodiments, the automated labeling coordinators 119 may fine tune or enhance existing ML models (including for example multi-lingual language models, versions of MTMs, and the like), which have been trained for other tasks, to also determine or infer TCA label sets for unlabeled observation records. A methodology called multi-task learning may be employed in some embodiments to enhance the existing ML models. The process of enhancing the models may involve starting with a model M1 trained to perform a task T1, optionally modifying the parameters or structure of M1, and further training M1 (e.g., with a small labeled training data set) to perform both its initial task T1 and a new task T2 which includes inferring TCAs. In some embodiments, so-called zero-shot cross-language transfer models may be employed to generate the label sets; such models may not require any labels for word sets in a particular language, but may nevertheless be able to infer TCAs for word sets in that language as discussed earlier. After sufficient labeled observation records 129, each comprising a translated pair of word sets and the associated TCA values, have been generated, a combination of the unlabeled and the labeled observation records may be used to train the models 142 in the depicted embodiment. Individual ones of the MTS components shown in FIG. 1 may be implemented using a combination of software and hardware of one or more computing devices in at least some embodiments. In at least some embodiments, some or all of the kinds of functionality described above as being performed using an MTS may instead be performed using tools or programs that are not part of a network-accessible service; for example, applications run at a mobile computing device, a phone, or a standalone computer system may provide the functionality.

Figure 2:
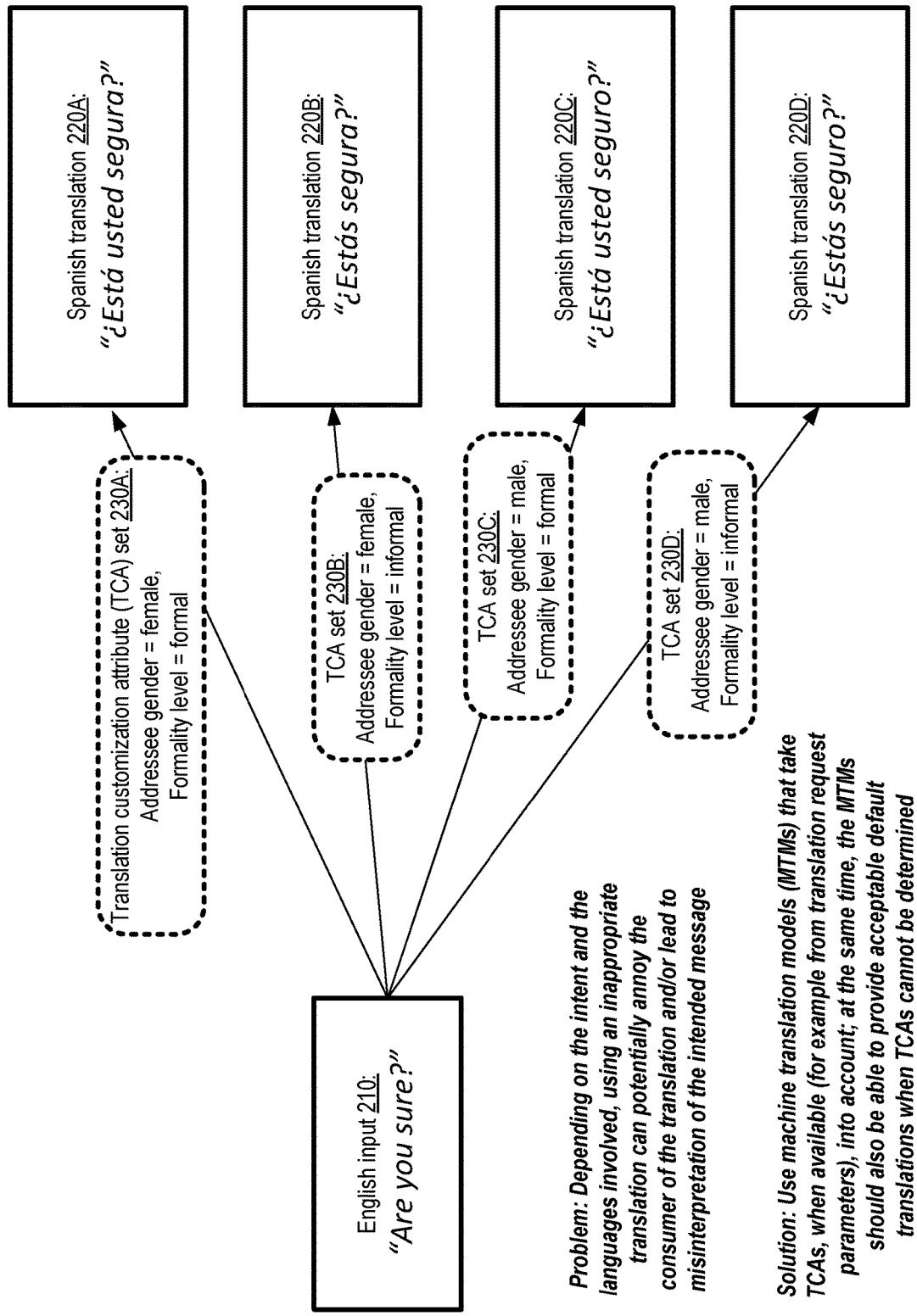
FIG. 2 illustrates an example scenario in which information about grammatical gender and formality level attributes can influence translation, according to at least some embodiments.

FIG. 2 illustrates an example scenario in which information about grammatical gender and formality level attributes can influence translation, according to at least some embodiments. In the scenario shown in FIG. 2, English input 210 comprising the sentence "Are you sure?" is to be translated into Spanish.

Even ignoring the possibility that the word "you" in English can refer to either a single entity or multiple entities, at least four grammatically correct translations of the English input 210 can be created in Spanish. These are shown as Spanish translations 220A-220D. In Spanish translation 220A, the addressee referenced by "you" is assumed to be female, and the translation is to be performed assuming a formal interaction between the questioner and the questioned party. In Spanish translation 220B, the addressee referenced by "you" is also assumed to be female, and the translation is to be performed assuming an informal interaction. In Spanish translation 220C, the addressee is assumed to be male, and the translation is to be performed assuming a formal interaction, while in Spanish translation 220D, the address is also assumed to be male but the interaction is informal.

As the different Spanish translations show, the spellings, word endings, or even the total number of words needed may change based on the different combinations of address gender and formality levels. Attributes such as addressee gender and formality level may each be termed a translation customization attribute (TCA) in various embodiments. Any given translation shown may be in accordance with a respective TCA set 230 (such as TCA sets 230A, 230B, 230C or 230D) comprising values of a combination of both TCAs considered in the example of FIG. 1. In general, a machine translation may be impacted by zero or more TCAs, depending on the languages involved. Depending on the context and the languages, using an inappropriate translation (e.g., Spanish translation 220B instead of Spanish translation 220A for a situation in which a formal interaction is expected) can potentially annoy the consumer or recipient of the translation (such as the addressee). In some cases, the underlying message intended to be conveyed by the source of the input may actually be misinterpreted or misunderstood due to the inadvertent use of the wrong TCA set. One potential technique that avoids such problems is to use MTMs of the kind introduced above, that take TCAs into account when values of the TCAs are available. Because there may be scenarios in which TCAs are not determinable, e.g., because the requester of a translation has not provided them and they cannot be inferred from context, the MTMs must also be able to provide acceptable default translations when TCAs cannot be identified for a given translation request in various embodiments.

FIG. 3 illustrates examples of attributes which may be taken into account at a machine translation service for customized translations, according to at least some embodiments. In various embodiments, values of some or all of the attributes shown in FIG. 3 may be used as part of the labels of translation unit pairs used for training MTMs, and/or values of some or all of the attributes may be obtained and used as input to the MTMs for processing translation requests. As discussed above in the context of FIG. 2, grammatical gender 310 of the addressee(s) to whom a communication is directed, and/or of the source(s) of the communication, may come into play when selecting an appropriate translation for some languages. Similarly, formality level 320 may also influence translations into or from some languages.

For some translation use cases, locally-prevalent measurement unit systems 330 may have to be taken into account. For example, technical publications/articles, documentation or specifications prepared in one geographical region or country, in which language L1 is the primary language of at least some residents, may contain measurement values for distances, weights, time, currencies etc. in units that are not commonly used in a different geographical region or country where a different language L2 is the primary language for residents. As such, when translating such artifacts from L1 to L2, an MTS may convert the units into the appropriate system expected to be used in the region(s) where L2 is used. In some cases, a submitter of a translation request may specify, as a customization attribute of the translation request, that units not be converted for that request, even though a different unit system is typically used in the region in which the target language L2 is prevalent than in the region in which the source language L1 is prevalent.

Some organizations may follow a set of presentation style guidelines 340 when preparing product documentation, customer support artifacts (such as knowledge base articles, frequently-asked questions (FAQs), educational materials such as textbooks, course notes and the like. Such presentation style guidelines may for example specify rules to be followed for grammar, text formatting, punctuation and the like, and in some cases the rules may be language-specific or culture-specific. The presentation style guidelines for a target language L2 may influence the way in which material prepared in a source language L1 is translated at an MTS into L2 in at least some embodiments. Note that some TCAs may affect the content (e.g., the specific words used) of a translation, while others may affect not just the words but the manner in which the words are arranged or presented.

In some embodiments, additional cultural constraints 350 may also impact translations. Such cultural constraints may for example require translation systems to avoid certain terms that have negative connotations in a given culture, avoid using acronyms if at all possible, use target age group specific terminology (e.g., avoid or use youth-oriented slang terms depending on the intended recipient(s) of a translation), and so on.

A quantity attribute 360 may indicate the manner in which some words in a language L1, which can each refer to one or more entities E in L1, are to be translated to a language L2 in which different words may be used to refer to a single entity E versus multiple entities E. For example, the word "you" in English can refer to a single entity or to multiple entities; in other languages different words may be used depending on the count of entities involved. For some use cases, there may be a constraint on the total length of the translated version of an input set of words. For example, when dubbing a motion picture or presenting subtitles for a motion picture, the total time or space available for the translation may be limited. Such constraints on output length 370 may represent another attribute which can influence translations. In some embodiments a client of a translation tool or service may wish to specify lists of blocked words (words that the client does not wish to be included in translations) or allowed words (words that the client prefers to include in preference to others, for example in a technical publication in which several different words could be used to refer to the same concept). Such lists of blocked/allowed words 380 may also be utilized to customize translations if desired. The term "transcreation" refers to adapting content from one language to another, while maintaining the tone, intent and style of the source language words, without necessarily being constrained by the strict meanings of individual words. Transcreation can be used, for example, when adapting names of companies, organizations or products from a language such as English to a language such as Mandarin in which certain characters (which may sound similar to a syllable in the English word being translated) may have more positive connotations than others. In at least one embodiment, a client of a translation service or tool may specify one or more transcreation-related attributes 390 (e.g., the specific set of characters to be selected from several viable alternatives to translate a product name or a set of product names) to customize a requested translation.

According to at least some embodiments, for a given translation request directed to an MTS, values of some combination of translation customization attributes (TCAs) of the kind shown in FIG. 3 may be provided by the submitter of the request, e.g., as parameters or environment variables applicable to the translation request. In at least one embodiment, an MTS may attempt to infer values of one or more attributes if they are not explicitly provided by the client, e.g., by using ML models to analyze earlier portions of a conversation to detect gender and/or formality level information. At least in some cases, the values of different translation customization attributes may be independent of one another; that is, given a value of one TCA applicable to a translation request, it may not be straightforward to determine the value of another TCA applicable to that translation request.

Figure 4:
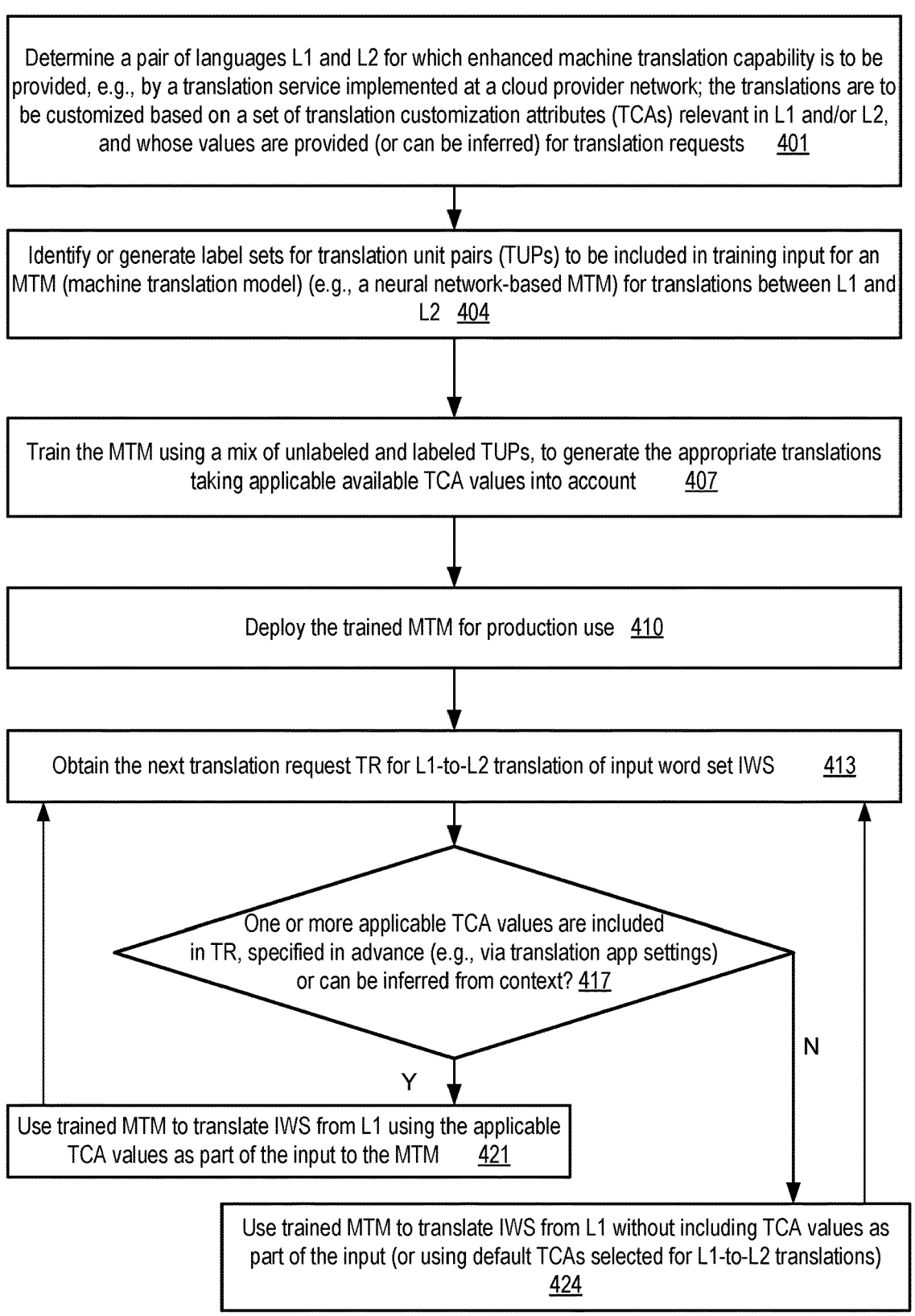
FIG. 4 is a flow diagram illustrating aspects of operations that may be performed at a translation service configured to customize translations based on inferred or provided customization attributes, according to at least some embodiments.

FIG. 4 is a flow diagram illustrating aspects of operations that may be performed at a translation service configured to customize translations based on inferred or provided customization attributes, according to at least some embodiments. As shown in element 401, a pair of languages L1 and L2 for which enhanced/customized machine translation capability is to be provided, e.g., by a translation service such as an MTS implemented at a cloud provider network, may be determined. The pair of languages may, for example, be identified based on client-specified requests to add the L1-to-L2 and L2-to-L1 translation features to the MTS's existing set of supported languages, analysis of business growth trends of organizations that provides goods and/or services internationally, demographic analysis, or based on other factors. The determination may also be made that the translations are to be customized based on values of a set of TCAs that are relevant (i.e., to determining the appropriateness of a translation) in the source or target languages L1 and/or L2, if such values are provided or can be inferred for translation requests.

Respective label sets may be identified or generated for some number of translation unit pairs (TUPs) that are to be included in the training data for a machine translation model (MTM) which is to be employed for translations between L1 and L2 (element 404). The MTM may comprise a deep neural network model in at least some embodiments; other types of machine learning models may be used in other embodiments. A given translation unit pair may comprise a first set of words in one of the languages (say L1) and a second set of words in the other language, representing a translation of the first set of words into the second set. A label set corresponding to a TUP may comprise values of one or more translation customization attributes (such as some combination of the attributes discussed in the context of FIG. 3) which correspond to, or are represented by, the particular translation represented in the TUP. In at least some embodiments, the label sets may be generated for unlabeled TUPs using one or more machine learning models at the MTS, such as a fine-tuned or modified version of a trained multi-lingual language model, a fine-tuned or modified version of a trained MTM, and/or a model that can perform zero-shot cross-language transfers of the kind discussed earlier. In at least one embodiment, an MTM that is used for generating the labels for TUPs comprising word sets in L1 and L2 may later (e.g., after further enhancement and training using the generated labels) be used as the production MTM for L1-to-L2 translations.

The MTM for which the label sets are generated may be trained at the MTS, e.g., using a mix of labeled and unlabeled TUPs in some embodiments as discussed in further detail below, to generate the appropriate translations taking applicable TCA values into account (element 407). After the MTM is trained sufficiently that it satisfies targeted translation quality requirements (as may be determined using evaluation protocols selected at the MTS), the MTM may be deployed for production use (element 410) in various embodiments. Note that when evaluating the MTM, the accuracy of its translations for translation requests of two types may be considered in the depicted embodiment-requests for which one or more TCA values are available, and also requests for which no TCA values are available.

In production use, the MTM may be utilized to perform L1-to-L2 or L2-to-L1 translations in response to requests of several types in some embodiments, including for example real-time translation requests as well as batch mode or asynchronous translation requests. When the next translation request TR is received at the MTS, e.g., indicating an input word set IWS for which L1 to L2 translation is required (element 407), a determination may be made whether one or more TCA values applicable to the request can be identified. If such values are included in the request TR itself, specified in advance of the TR (e.g., via settings of a translation app used to submit the request), or can be inferred from the context of the IWS (e.g., from machine learning-based analysis of earlier portions of a conversation or document of which the IWS is a part), as determined in operations corresponding to element 417, the trained MTM may be used to translate IWS from L1 to L2 in accordance with the TCA values, e.g., by including the TCA values as part of the input of the MTM (element 421). The combination of one or more TCA values identified for TR may be collectively referred to as an attribute value tuple. If no TCA values can be determined for TR, in at least some embodiments the same trained MTM may be used to translate IWS from L1 to L2 without including any TCA values as part of the MTM input (element 424). In one embodiment, if no TCA values can be determined for TR, a default set of TCAs for L1-to-L2 translations, determined in advance at the MTS, may be included in the input to the MTM. Note that the same input set of words may potentially be translated into a first output set of words by the MTM if a TCA value tuple can be identified for the input, and into a second output set of words (which may in some cases differ from the first output set of words) if no TCA values associated with the input can be identified. Of course, in some cases, identical translated output may be produced for a given set of input words, whether TCA values can be identified for the input or not.

Operations corresponding to elements 413 onwards may be implemented for each L1-to-L2 translation request directed to the MTS in at least some embodiments. Operations corresponding to elements 401 onwards may be conducted for each language pair for which translations are to be provided by the MTS in various embodiments. In some embodiments, a single MTM may be used for customizable translations between multiple pairs of languages, such as (L1, L2), (L1, L3), (L2, L3), etc. In other embodiments, a respective MTM may be used for translations between a respective pair of languages. In some embodiments, a given MTM may be used only for translations in a particular direction—e.g., an MTM M1 may be trained to translate L1 into L2, and a different MTM M2 may be trained to translate L2 into L1. In one embodiment, different MTMs may be used for real-time translations than are used for asynchronous or batch mode translations.

Figure 5:
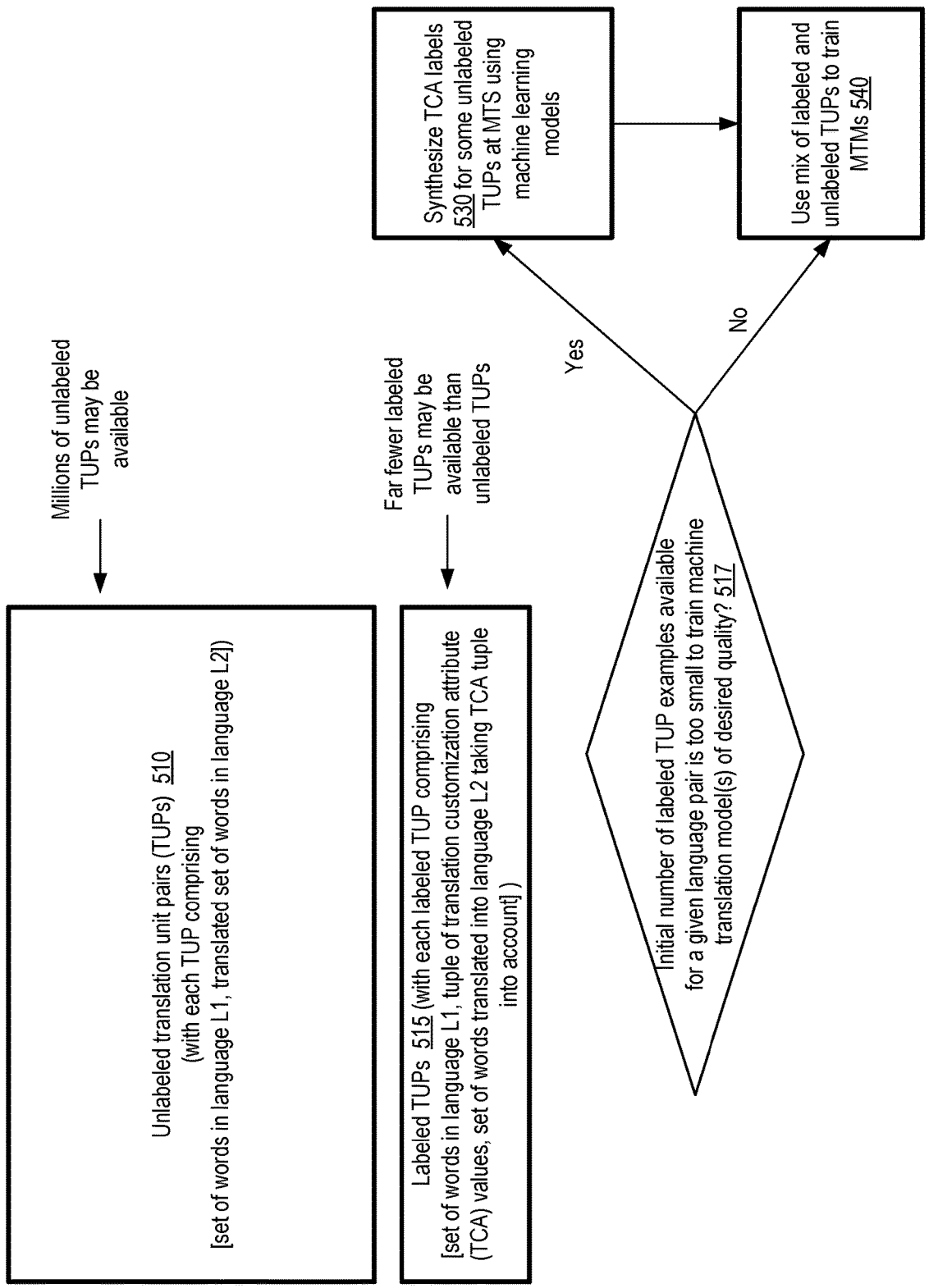
FIG. 5 illustrates a scenario in which labels comprising translation customization attributes may be generated under certain conditions for training machine translation models, according to at least some embodiments.

FIG. 5 illustrates a scenario in which labels comprising translation customization attributes may be generated under certain conditions for training machine translation models, according to at least some embodiments. Depending on the particular pair of languages and the problem domains for which translations are needed from an MTS similar in features and functionality to MTS 101 of FIG. 1, in some embodiments a fairly large set of unlabeled translation unit pairs (TUPs) 510 may be available, e.g., from sources such as publicly-available repositories used in machine translation research. Each such TUP may comprise a set of words in a language L1, and a grammatically valid translation of that set of words into language L2.

A labeled TUP 515 may comprise not only the two word sets of the TUP, but also a set of TCA values which, if they had been considered or were considered during the translation from L1 to L2, would result in the specific translation represented in the TUP. In contrast to unlabeled TUPs, of which millions of examples may be available for some language pairs, the number of labeled TUPs 515 available for the same language pair from the same sources may typically be much smaller. Such differences in the counts of pre-existing labeled and unlabeled examples may exist because (among other reasons) unlabeled translations may be generated for various purposes outside of research (and then used in research), while there may not be much motivation outside a relatively small research community to obtain and use labels for translations.

If the MTM to be trained to perform customizable translations from L1 to L2 requires a large training data set (as is often the case for deep neural network based MTMs), the count of pre-labeled TUPs is insufficient to train an MTM of the desired quality, and there are numerous un-labeled TUPs available, it may make sense for the MTS to attempt to generate labels comprising TCAs for at least some unlabeled TUPs in the depicted embodiment, as indicated in element 517. In at least some embodiments, any of several types of machine learning models may be used to produce the labels as indicated in element 530. After a sufficient number of labeled TUPs have been accumulated, in various embodiments, a mix of unlabeled and labeled TUPs may be used to train the MTM to be used for processing clients' translation requests (element 540). Of course, if a sufficient number of labeled TUP examples are available to train an MTM of a desired quality, generation of additional labels may not be required. Note that in some embodiments, it may not be known in advance whether the number of labeled TUPs is sufficient to train an MTM of a desired quality. In such a scenario, an iterative process of partially training the MTM using the currently-available set of labeled TUPs, evaluating the MTM's quality, generating additional labeled TUPs if the quality objectives aren't met, and training the MTM further using the accumulated collection of TUPs may be utilized in at least one embodiment.

FIG. 6 illustrates example techniques for generating translation customization attributes as labels for translation unit pairs, according to at least some embodiments. In various embodiments, one or more of the illustrated techniques may be used at an MTS. In the first approach shown in FIG. 6, a pre-trained multi-lingual language model 630 may be refined or modified, e.g., using a multi-task learning methodology and a small additional training data set with target language examples comprising TCA labels. The language model (such as a variant of multi-lingual BERT or XLM-R) may originally have been trained to perform some task other than translations. As part of the refinement or fine tuning, in some cases the structure (e.g., the number or type of layers in a neural network used for the model) of the pre-trained language model may be changed, and the model may be trained further to also provide TCA labels as outputs in addition to (or instead of) performing its original task.

Instead of using language models, a pre-trained MTM 640 may be refined or modified, e.g., also using a multi-task learning methodology, to generate TCA labels in one embodiment. In at least some embodiments, after the TCA labels are generated, they may be used to train the MTM further for use in production environments; that is, respective variants of the same underlying MTM may be used to generate TCA labels, and then to respond to translation requests submitted by clients of the MTS by providing TCA-based or TCA-dependent translations.

In some embodiments, an iterative approach may be used to generate TCA labels using a pre-trained model M1 (e.g., a multi-lingual language model or an MTM) and multi-task learning. A small set of labeled TUPs LS1 may first be obtained, e.g., using human annotators, and provided as training input to M1 to obtain a modified version M2 of the model that can generate TCAs for unlabeled TUPs. Then, M2 may be used to accumulate an additional set LS2 of TCA-labeled TUPs; LS2 may then be used to train M2 further, resulting in an improved version M3 of the model, which may then be used to create additional labels, and so on, until a sufficient quantity of correctly-labeled TUPs become available.

Figure 7:
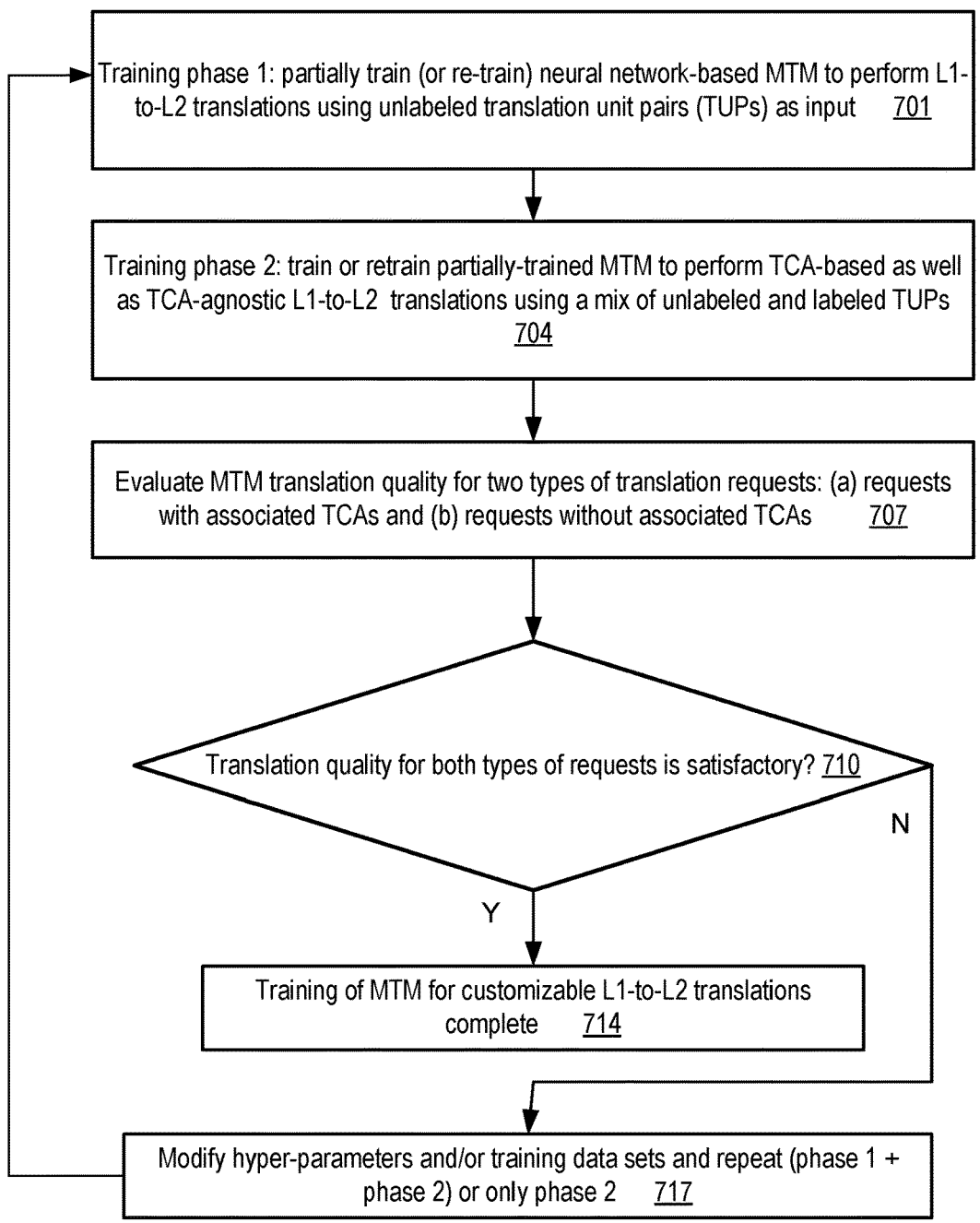
FIG. 7 is a flow diagram illustrating aspects of operations that may be performed to train a machine translation model that can provide high quality translations regardless of whether customization attributes can be determined for translation requests or not, according to at least some embodiments.

A machine learning model which can perform zero-shot cross-lingual transfer 650 may be employed in some embodiments to generate TCA labels. As described earlier, such a model may provide, as output, an inferred value of a TCA for at least one word set in a particular language, without having been trained using labeled word sets in that language. Other types of machine learning models, not shown in FIG. 6, may be employed to generate labels for TUPs in some embodiments FIG. 7 is a flow diagram illustrating aspects of operations that may be performed to train a machine translation model that can provide high quality translations regardless of whether customization attributes can be determined for translation requests or not, according to at least some embodiments. A multi-phase training methodology may be adopted to help ensure that the machine translation model (MTM) can produce both types of translations (with and without TCAs) well in the depicted embodiment. In one phase of the training, referred to as training phase 1 in FIG. 7, a neural network-based MTM may be partially trained to perform L1-to-L2 translations using a training data set that consists of unlabeled TUPs (element 701). From this type of training input, the MTM may learn how to translate in scenarios in which TCAs cannot be ascertained. Phase 1 training may be terminated after a selected number of passes or epochs through the unlabeled training data set in the depicted embodiment, with the number of epochs being selected for example via hyper-parameter tuning, based on knowledge base entries, or when desired performance levels are reached.

In training phase 2, shown in element 704, the MTM may be trained further, this time using a mix of K % labeled TUPs and (100-K) % unlabeled TUPs, to perform both TCA-agnostic L1-to-L2 translations and TCA-dependent L1-to-L2 translations. The parameter K indicating the mix of labeled and unlabeled TUPs, and the number of epochs used for phase 2 training, may also be selected using hyper-parameter tuning techniques and/or knowledge base entries pertaining to the L1-L2 language pair in some embodiments. Note that in some cases in which several different TCAs are relevant for the L1-L2 language pair, some labeled TUPs may have values for all the different TCAs, while others may have values for only a subset of the TUPs in some embodiments. In other embodiments, values for all TCAs may be included in each labeled TUP example. In at least one embodiment, some labels may have been obtained earlier using machine learning models as discussed in the context of FIG. 6.

The quality of the translations produced by the MTM for both categories of translation requests (requests with and without associated TCAs) may be evaluated in various embodiments (element 707). In some embodiments, a quality evaluation protocol that asks people fluent in L1 and L2 to judge the quality of the MTM's translations. In other embodiments, the evaluations may be conducted using hold-out subsets of the TUP examples for which the correct translations are known, or using a combination of hold-out data and human judges.

If the translation quality for both types of requests is found to be satisfactory (as detected in operations corresponding to element 710), the training of the MTM for customizable L1-to-L2 translations may be deemed to be complete (element 714) in the depicted embodiment. If, however, the quality for one or both types of translations is not satisfactory, additional training may be conducted. For example, one or more hyper-parameters may be modified and/or additional training examples may be generated or obtained, and additional phase 1 and/or phase 2 training may be conducted in the depicted embodiment, as indicated in element 717.

It is noted that in various embodiments, some of the operations shown in FIG. 4 and/or FIG. 7 may be implemented in a different order than that shown in the figure, or may be performed in parallel rather than sequentially. For example, with respect to FIG. 7, instead of checking the quality of the MTM's translations for both types of translations after completing phase 1 as well as phase 2 training in a particular iteration, the quality of TCA-agnostic translations may be evaluated initially after phase 1. Some of the operations shown in FIG. 4 and/or FIG. 7 may not be required in one or more implementations.

FIG. 8 illustrates example problem domains in which customized machine translation techniques may be beneficial, according to at least some embodiments. The hospitality domain 801 is one in which effective translations between multiple languages are often required, for example in a scenario in which a hotel front desk employee that is not fluent in a language L1 has to interact with a guest who is fluent primarily in L1. If attributes such as formality and gender are not used correctly during interactions with a hotel guest, the guest may develop a negative impression of the hotel. A device or application that allows the front-desk employee to use an MTS to obtain appropriate translations in real time may thus be extremely valuable to the hotel operator. Similar situations may be encountered on cruise ships and in other travel-related interactions, in restaurants, and so on.

Documents used in the education arena 804 may also have to be translated carefully, taking at least some TCAs (including style guide-based TCAs) into account in various embodiments. Customer support 807 (e.g., provided via live chats and/or using bots) may also benefit from using TCA-aware translations. Technical documentation 810 which may be provided to customers of multinational business and/or governmental organizations may also potentially lead to misunderstandings or repeated support calls if translations are not generated carefully. As discussed earlier, translations used for real-time meetings or conversations 812 may also ideally take TCAs into account. Inappropriate translations of social media application posts 814 can cause non-trivial problems, especially given the immediate and widespread propagation of such posts, so the use of TCA-aware translation techniques may also be extremely beneficial in the social media domain.

Figure 9:
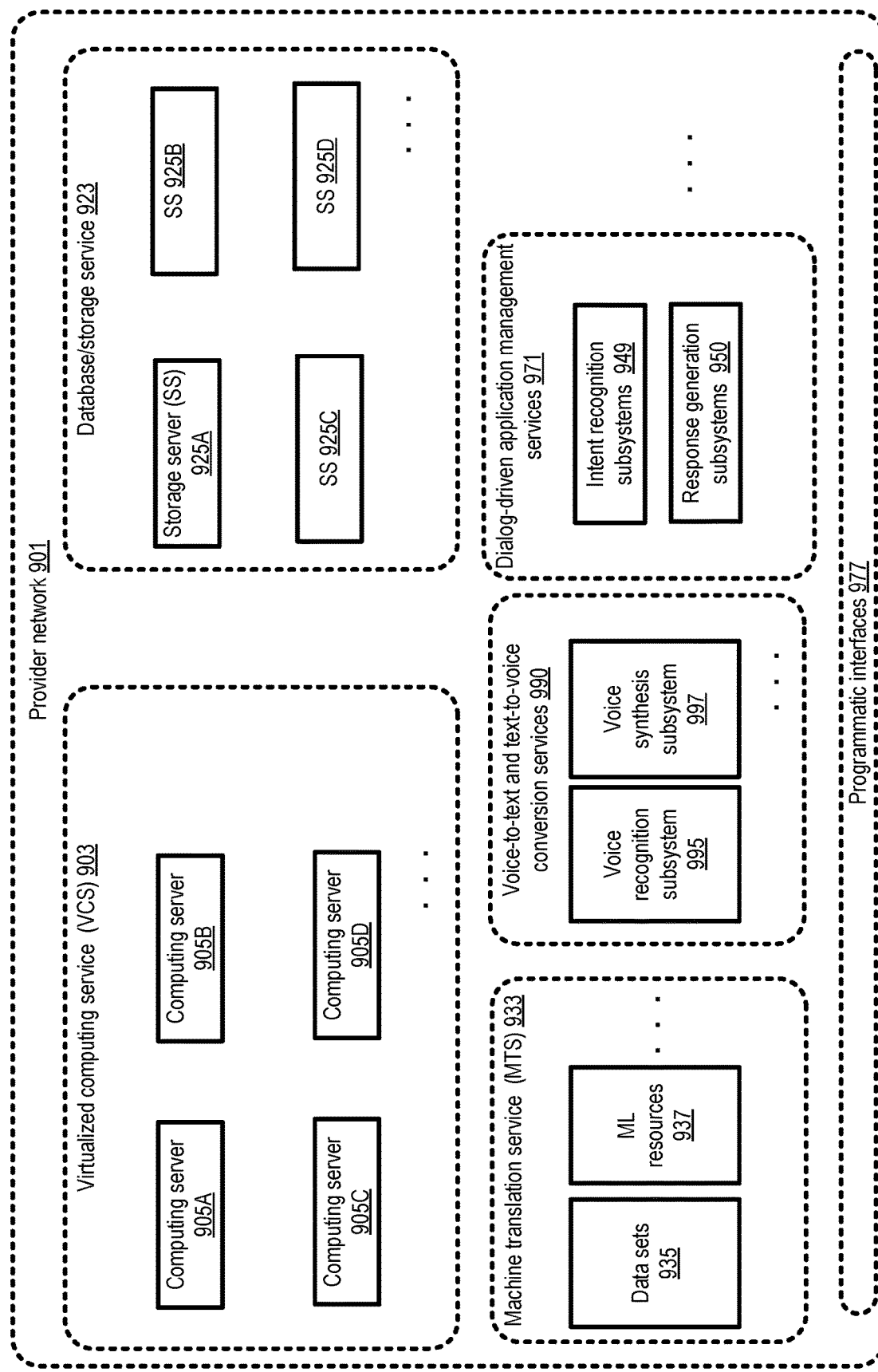
FIG. 9 illustrates an example provider network environment at which a machine translation service may be implemented, according to at least some embodiments.

FIG. 9 illustrates an example provider network environment at which a machine translation service may be implemented, according to at least some embodiments. In the depicted embodiment, provider network 901 may comprise resources used to implement a plurality of services, including for example a virtualized computing service (VCS) 903, a database/storage service 923, an MTS 933, voice-to-text and text-to-voice conversion service 990, and a dialog-driven application management service 971 and the like. The MTS 933 may comprise ML resources 937 used for training models, generating TCA label sets, and generating real-time and asynchronous translations using techniques of the kind discussed above. Data sets 935 used at the MTS may comprise labeled and unlabeled translation unit pairs (TUPs) in the depicted embodiment.

The MTS and one or more other services of provider network 901 may be utilized jointly by some provider network clients for their applications. Voice-to-text and text-to-voice conversion services 990 may comprise voice recognition subsystem 995 and voice synthesis subsystem 997 in the depicted embodiment, and these subsystems may be utilized to (for example) recognize utterances in a particular language before those utterances are translated using the MTS 933, or to convert the translated version of a set of words into voiced format if desired. At dialog-driven application management services 971, automated customer support applications or chatbot applications may utilize the MTS when needed to respond to dialog in a particular language. Intent recognition subsystems 949 may for example be designed to determine the intent (e.g., a desired service or product) corresponding to a portion of a customer's utterances or messages, while response generation subsystems 950 may prepare the responses to the customer.

Components of a given service may utilize components of other services in the depicted embodiment—e.g., for some translation-related computations, virtual machines implemented at computing servers such as 905A-905D of the virtualized computing service 903 may be used by the MTS, input data, metrics and/or output produced at the MTS may be stored at storage servers 925 (e.g., 925A-925D) of storage service 923, and so on. Individual ones of the services shown in FIG. 9 may implement a respective set of programmatic interfaces 977 which can be used by external and/or internal clients (where the internal clients may comprise components of other services) in the depicted embodiment.

Figure 10:
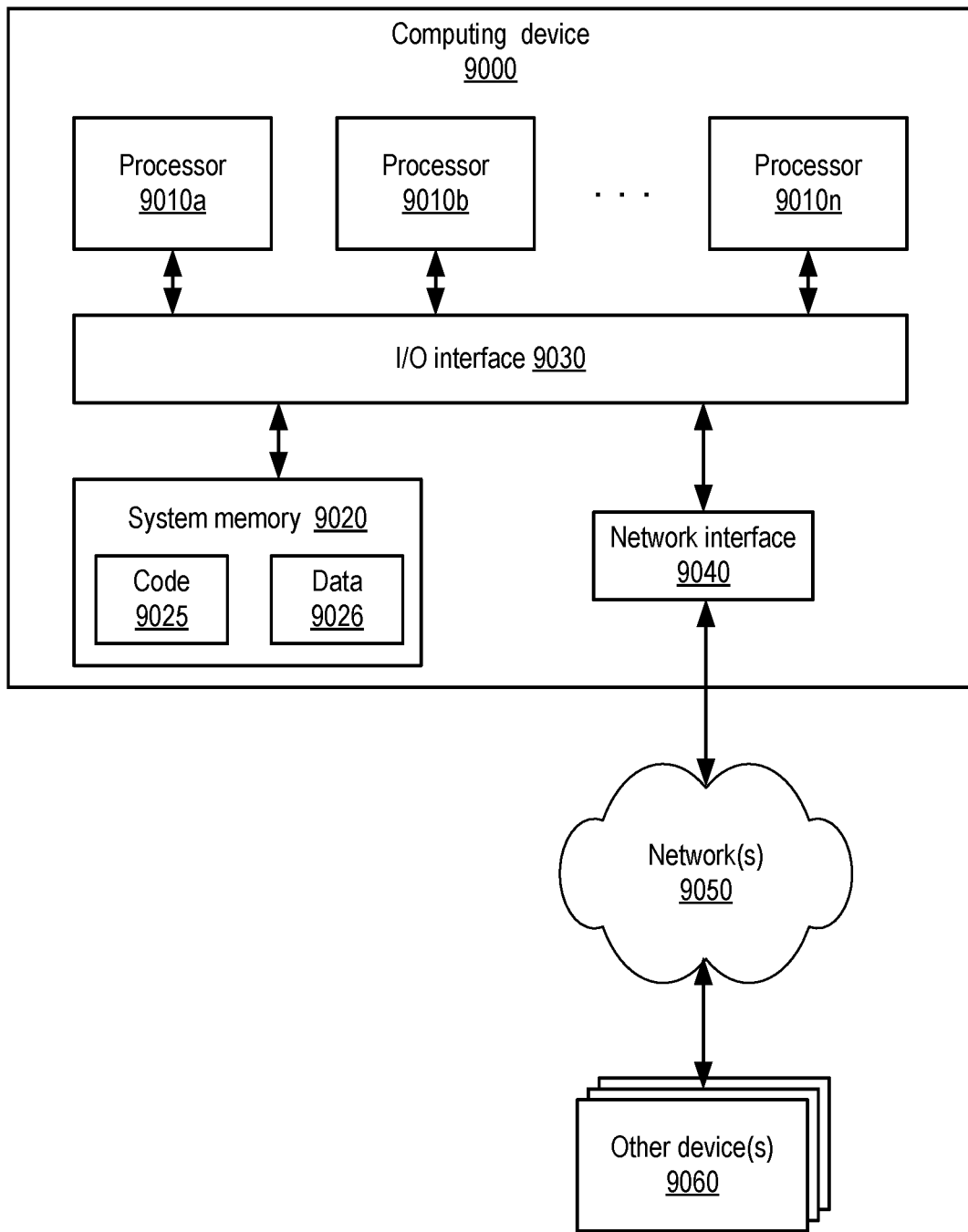
FIG. 10 is a block diagram illustrating an example computing device that may be used in at least some embodiments.

In at least some embodiments, a server that implements the types of techniques described herein (e.g., various functions of an MTS and other services of a provider network), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices:
obtain, from one or more machine learning models at a translation service of a provider network, a respective label set for individual ones of a plurality of unlabeled translation unit pairs, wherein a translation unit pair comprises a first set of words in a first language and a second set of words in a second language, wherein a label set for a particular translation unit pair indicates, for at least one set of words of the translation unit pair, respective values of a plurality of translation customization attributes from a collection of translation customization attributes which includes (a) grammatical gender and (b) formality level, and wherein the second set of words represents a translation of the first set of words from the first language to the second language in accordance with the label set;
in response to determining a first attribute value tuple associated with a first request to translate a first input set of words in the first language into the second language, wherein the first attribute value tuple comprises respective values of a first group of one or more translation customization attributes of the collection, and wherein at least one translation customization attribute of the first attribute value tuple is indicated by a submitter of the first request,
generate, at the translation service, a first translated version of the first input set of words, wherein the first translated version comprises a translation of the first input set of words into the second language in accordance with the first attribute value tuple, and wherein the first translated version is generated using a particular machine translation model trained at least in part using respective label sets obtained for the plurality of unlabeled translation unit pairs; and
in response to a second request to translate the first input set of words into the second language, wherein a submitter of the second request does not indicate a translation customization attribute for the second request,
generate, at the translation service, a second translated version of the first input set of words, wherein the second translated version comprises a translation of the first input set of words into the second language, wherein the second translated version is generated using the particular machine translation model, and wherein the second translated version differs from the first translated version.

2. The system as recited in claim 1, wherein the one or more machine learning models from which the respective label sets are obtained comprise a zero-shot cross-lingual transfer model which provides, as output, an inferred value of a first translation customization attribute of a particular set of words in the second language, and wherein the zero-shot cross-lingual transfer model is trained using a training data set which (a) does not include values of the first translation customization attribute for word sets in the second language and (b) does include values of the first translation customization attribute for word sets in a language other than the second language.

3. The system as recited in claim 1, wherein the first request comprises a request to translate, in real time, a portion of a conversation between the submitter of the first request and another entity, and wherein the one or more computing devices include further instructions that upon execution on or across the one or more computing devices:
cause the first translated version to be presented to the other entity.

4. The system as recited in claim 1, wherein the first input set of words includes a measured value expressed in units of a first measurement unit system utilized in a first geographical region in which the first language is used as a primary language, and wherein in the first translated version, the measured value is transformed and expressed in units of a second measurement unit system utilized in a second geographical region in which the second language is used as a primary language, and wherein the first attribute value tuple comprises an indication of the second measurement unit system.

5. The system as recited in claim 1, wherein the one or more computing devices include further instructions that upon execution on or across the one or more computing devices:
train the particular machine translation model in multiple phases, wherein (a) a training data set for a particular phase of the multiple phases does not include translation unit pairs with corresponding label sets, and (b) a training data set for a subsequent phase of the multiple phases comprises a translation unit pair with a corresponding label set.

6. A computer-implemented method, comprising:
obtaining a label set for individual ones of a plurality of translation unit pairs, wherein an individual translation unit pair comprises a first set of words in a first language and a second set of words in a second language, wherein the second set of words represents a translation of the first set of words from the first language to the second language, and wherein the label set for a particular translation unit pair indicates, for at least one set of words of the translation unit pair, respective values of one or more translation customization attributes of a collection of translation customization attributes which includes grammatical gender;
identifying a first attribute value tuple associated with a first request to translate a first input set of words in the first language into the second language, wherein the first attribute value tuple includes a value of a translation customization attribute of the collection;
generating, in response to the first request, a first translated version of the first input set of words, wherein the first translated version comprises a translation of the first input set of words into the second language in accordance with the first attribute value tuple, and wherein the first translated version is generated using a particular machine translation model trained at least in part using respective label sets obtained for the plurality of translation unit pairs; and
generating, in response to a second request to translate the first input set of words into the second language wherein the translation customization attribute is not indicated for the second request,
 a second translated version of the first input set of words, wherein the second translated version comprises a translation of the first input set of words into the second language, wherein the second translated version is generated using the particular machine translation model, and wherein the second translation version differs from the first translated version.

7. The computer-implemented method as recited in claim 6, further comprising:
obtaining, via a programmatic interface, from a submitter of the first request, a value of at least one translation customization attribute of the first attribute value tuple.

8. The computer-implemented method as recited in claim 6, further comprising:
automatically inferring, based at least in part on a context of the first input set of words, a value of at least a first translation customization attribute of the first attribute value tuple, without obtaining the value of the first translation customization attribute from a submitter of the first request.

9. The computer-implemented method as recited in claim 6, wherein the collection of translation customization attributes includes one or more of: (a) a formality level, (b) a location-dependent measurement unit system, (c) a presentation style guideline for a document, (d) a quantity, (e) a blocked word, (f) an allowed word, (g) a constraint on output length, or (h) a transcreation attribute.

10. The computer-implemented method as recited in claim 6, wherein the first input set of words is obtained via one or more of: (a) a microphone or (b) a text input interface of a phone or a mobile computing device.

11. The computer-implemented method as recited in claim 6, further comprising:
training the particular machine translation model in multiple phases, wherein (a) a training data set for a particular phase of the multiple phases does not include translation unit pairs with corresponding label sets, and (b) a training data set for a subsequent phase of the multiple phases comprises a translation unit pair with a corresponding label set.

12. The computer-implemented method as recited in claim 6, further comprising:
modifying, using multi-task learning, a pre-trained machine learning model to infer translation customization attributes for translation unit pairs, wherein at least a portion of the label set for a particular translation unit pair is generated using a version of the pre-trained machine learning model obtained as a result of said modifying.

13. The computer-implemented method as recited in claim 12, wherein the pre-trained machine learning model includes a neural network comprising a first set of layers, and wherein the modifying comprises one or more of: (a) adding a layer to the pre-trained machine learning model or (b) modifying a layer of the first set of layers.

14. The computer-implemented method as recited in claim 12, wherein the pre-trained machine learning model comprises one of: (a) a multi-lingual language model which has been trained to perform a task other than translation or (b) another machine translation model which has been trained to translate word sets without taking translation customization attributes into consideration.

15. The computer-implemented method as recited in claim 6, wherein at least a portion of the label set is obtained using a first machine translation model, and wherein the particular machine translation model comprises a version of the first machine translation model.

16. One or more non-transitory computer-accessible storage media storing program instructions that when executed on or across one or more processors:
obtain a label set for individual ones of a plurality of translation unit pairs, wherein an individual translation unit pair comprises a first set of language elements in a first language and a second set of language elements in a second language, wherein the second set of language elements represents a translation of the first set of language elements from the first language to the second language, and wherein the label set for a particular translation unit pair indicates, for at least one set of language elements of the translation unit pair, respective values of one or more translation customization attributes of a collection of translation customization attributes;
identify a first attribute value tuple associated with a first request to translate a first input set of language elements in the first language into the second language, wherein the first attribute value tuple includes a value of a translation customization attribute of the collection; and
in response to the first request,
 generate, using a particular machine translation model trained at least in part using the respective label sets obtained for the plurality of translation unit pairs, a first translated version of the first input set of language elements, wherein the first translated version comprises a translation of the first input set of language elements into the second language in accordance with the first attribute value tuple including the value of the translation customization attribute;
in response to a second request to translate the first input set of language elements in the first language into the second language, wherein the value of the translation customization attribute is not indicated for the second request,
generate a second translated version of the first input set of words, wherein the second translated version comprises a translation of the first input set of words into the second language, wherein the second translated version is generated using the particular machine translation model, and wherein the second translation version differs from the first translated version.

17. The one or more non-transitory computer-accessible storage media as recited in claim 16, wherein the first request comprises a request to translate a document which includes the first input set of language elements.

18. The one or more non-transitory computer-accessible storage media as recited in claim 16, storing further program instructions that when executed on or across the one or more processors:
obtain, via a programmatic interface, from a submitter of the first request, a value of at least one translation customization attribute of the first attribute value tuple.

19. The one or more non-transitory computer-accessible storage media as recited in claim 16, storing further program instructions that when executed on or across the one or more processors:
infer, based at least in part on a context of the first input set of language elements, a value of at least a first translation customization attribute of the first attribute value tuple, without obtaining the value of the first translation customization attribute from a submitter of the first request.

20. The one or more non-transitory computer-accessible storage media as recited in claim 16, wherein the collection of translation customization attributes includes one or more of: (a) a gender, (b) a formality level, (c) a location-dependent measurement unit system, (d) a presentation style guideline for a document, (e) a quantity, (f) a blocked word, (g) an allowed word, (h) a constraint on output length, or (i) a transcreation attribute.

* * * * *